United States Patent

[11] 3,585,622

| [72] | Inventors | Clark E. Quinn<br>Rochester;<br>Joseph Felice, East Detroit, both of, Mich. |
|---|---|---|
| [21] | Appl. No. | 757,266 |
| [22] | Filed | Sept. 4, 1968 |
| [45] | Patented | June 15, 1971 |
| [73] | Assignee | General Motors Corporation<br>Detroit, Mich. |

[54] VIBRATORY LIQUID LEVEL DETECTOR
7 Claims, 1 Drawing Fig.

[52] U.S. Cl. .................................................... 340/244
[51] Int. Cl. ...................................................... G08b 21/00
[50] Field of Search ........................................... 340/244,
253, 258 A, 261, 310, 239, 246, 214, 410, 411;
317/156

[56] References Cited
UNITED STATES PATENTS
3,368,213  2/1968  Quinn ............................ 340/244

*Primary Examiner* — John W. Caldwell
*Assistant Examiner* — Daniel Myer
*Attorneys* — E. W. Christen, C. R. Meland and Tim G. Tagodzinski ABSTRACT: A vibratory liquid level detector includes an electromagnetic driving coil and an electromagnetic sensing coil arranged so that a test signal is induced in the sensing coil each time the driving coil is energized thereby indicating that the liquid level detector is functioning properly.

PATENTED JUN 15 1971   3,585,622
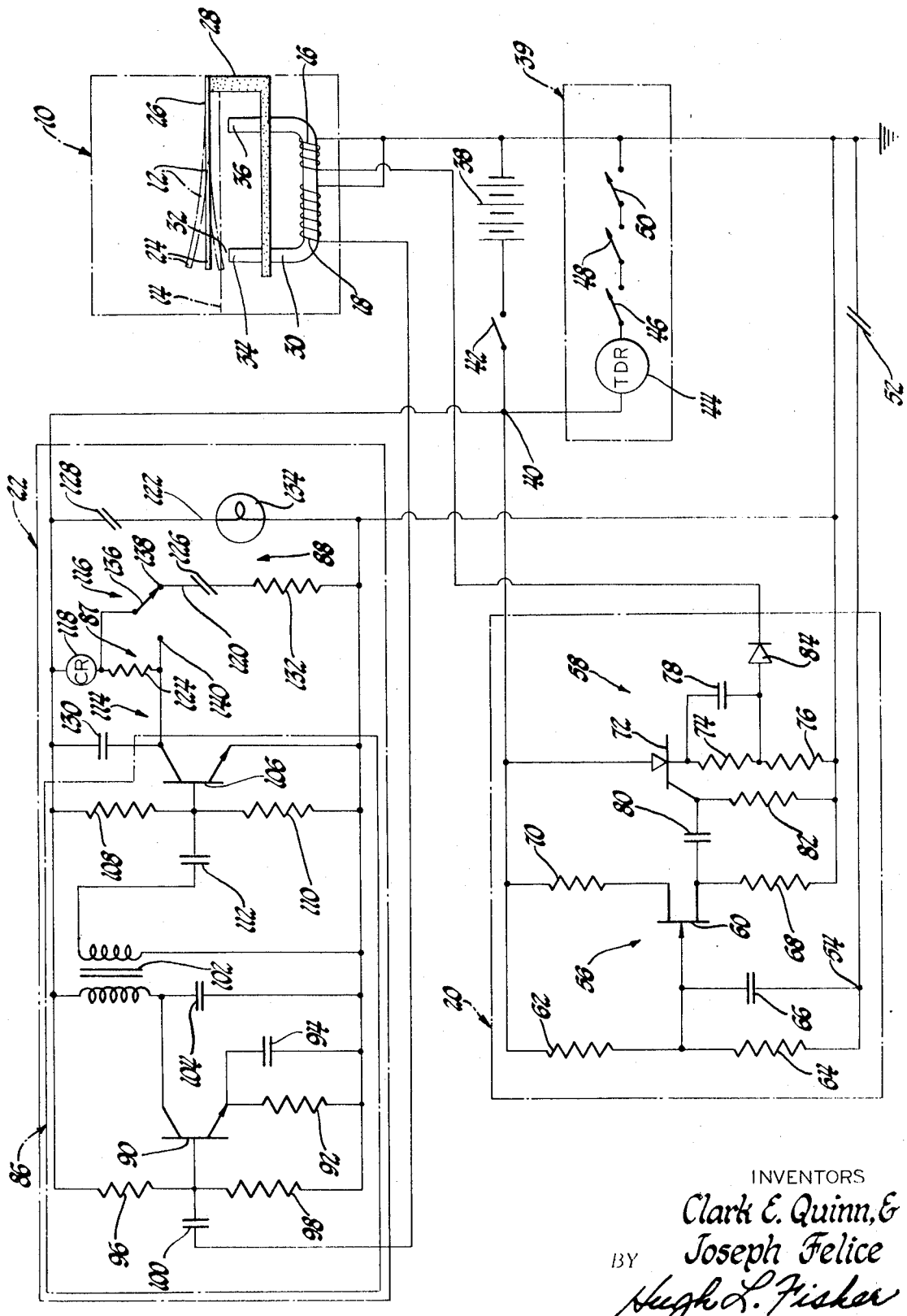
INVENTORS
Clark E. Quinn, &
BY Joseph Felice
Hugh L. Fisher
ATTORNEY

VIBRATORY LIQUID LEVEL DETECTOR

DISCLOSURE

This invention relates to an apparatus for monitoring the level of a liquid, and more particularly to a vibratory liquid level detector of the single signal type.

In a typical vibratory liquid level detector of the single signal type, a magnetic reed is positioned relative to a liquid reservoir so that movement of the reed is substantially damped by the liquid when the liquid is at and above the level to be detected and so that movement of the reed is substantially undamped by the liquid when the liquid is below the level to be detected. An electromagnetic driving coil and an electromagnetic sensing coil are magnetically coupled with the reed. A driving circuit energizes the driving coil so as to produce predetermined vibrations of the reed when the reed is substantially undamped by the liquid so that the predetermined vibrations of the reed induce a corresponding vibration signal in the sensing coil. A sensing circuit is responsive to the vibration signal so as to indicate that the liquid is below the level to be detected.

Thus, in a vibratory liquid level detector of the single signal type, a single output signal is produced only when the liquid is below the level to be detected. When the liquid is at and above the level to be detected, no output signal is generated by the liquid level detector. Hence, when a vibratory liquid level detector of the single signal type is applied to monitor the level of a liquid which is substantially stationary above the level to be detected, it is ordinarily impossible to determine whether the liquid level detector is functioning properly without removing it from the working environment for testing. However, where the location of the liquid level detector is relatively inaccessible, removal from the working environment for testing is impractical.

Accordingly, it is an object of this invention to provide a vibratory liquid level detector of the single signal type which may be tested in order to ascertain whether the liquid level detector is functioning properly without removing it from the working environment. It is another object of this invention to provide a vibratory liquid level detector of the single signal type incorporating a testing facility for automatically checking the operation of the liquid level detector in the working environment. It is a further object of this invention to provide a vibratory liquid level detector of the single signal type incorporating a testing facility for automatically checking the operation of the driving coil, the sensing coil, the driving circuit, and the sensing circuit each time the driving coil is energized by the driving circuit in the working environment.

In order to accomplish these and other objects, a preferred embodiment of the invention provides a vibratory liquid level detector of the single signal type wherein the driving coil and the sensing coil are magnetically coupled with each other so that a test signal is induced in the sensing coil each time the driving coil is energized in the working environment. The presence of the test signal indicates that the driving coil, sensing coil, the driving circuit, and the sensing circuit are functioning properly.

The invention may be best understood by referring to the following detailed description of the preferred embodiment when considered in conjunction with the accompanying drawing in which the sole FIGURE is a schematic diagram of a vibratory liquid level detector of the single signal type incorporating the principles of the invention.

Referring generally to the drawing, the preferred embodiment of the invention comprises a vibratory liquid level detector of the single signal type for monitoring the level of a liquid in a reservoir 10. A movable element or flexible magnetic reed 12 is positioned relative to the reservoir 10 so that movement of the reed 12 is substantially damped by the liquid when the liquid is at and above a level to be detected 14, and so that movement of the reed 12 is substantially undamped by the liquid when the liquid is below the level to be detected 14. An electromagnetic driving winding or coil 16 and an electromagnetic sensing winding or coil 18 are arranged in magnetic coupling relationship with the reed 12 and with each other. A driving circuit 20 energizes the driving coil 16 so as to generate a corresponding energization or test signal in the sensing coil 18 and so as to produce predetermined vibrations of the reed 12 when movement of the reed 12 is substantially undamped by the liquid within the reservoir 10. The predetermined vibrations of the reed 12 generate a corresponding vibration signal in the sensing coil 18. A sensing circuit 22 is responsive to the vibration signal so as to indicate that the liquid in the reservoir 10 is below the level to be detected 14 and is responsive to the test signal so as to indicate that the driving coil 16, the sensing coil 18, the driving circuit 20, and the sensing circuit 22 are functioning properly.

The reed 12 includes a free end 24 and a fixed end 26. The fixed end 26 is attached to a support member 28 which is mounted on a vertical wall of the reservoir 10 so as to position the reed 12 within the reservoir 10 at approximately the level to be detected 14. Preferably, the flexible reed 12 is made of a highly resilient ferromagnetic material and the support member 28 is made of a relatively nonmagnetic insulating material. A magnetic circuit is provided by a magnetic core 30 having a gap 32 defined between a pair of poles 34 and 36. Preferably, the magnetic core 30 is made of a very hard ferromagnetic material having a high magnetic flux retentivity. The magnetic core 30 is attached to the support member 28 so as to extend within the reservoir 10. The ferromagnetic reed 12 is located across the poles 34 and 36 of the magnetic core 30 so as to be magnetically embraced within the gap 32. The driving coil 16 and the sensing coil 18 are wound upon the magnetic core 30. Thus, the driving coil 16, the sensing coil 18, and the reed 12 are mutually linked by the magnetic circuit.

The driving circuit 20 intermittently applies an energizing voltage pulse to the driving coil 16 so as to develop a surge magnetic flux within the magnetic core 30. As the energizing voltage pulse is initiated, the magnetic flux within the magnetic core 30 increases rapidly so as to establish an increasing magnetic field within the gap 32 thereby attracting the ferromagnetic reed 12 downwardly from an equilibrium position toward the poles 34 and 36. As the energizing voltage pulse is terminated, the magnetic flux within the magnetic core 30 decreases rapidly so as to establish a decreasing magnetic field within the gap 32 thereby releasing the ferromagnetic reed 12 which initially springs upwardly away from the poles 34 and 36. Thus, the energization of the driving coil 18 with a voltage pulse deflects or "plucks" the reed 12.

When the liquid within the reservoir 10 is below the level to be detected 14, movement of the reed 12 is substantially undamped by the liquid so that once the reed 12 is "plucked" from its equilibrium position, the reed 12 vibrates within the gap 32. The reed 12 vibrates at an amplitude which is initially above a predetermined amplitude and which gradually diminishes below the predetermined amplitude as the reed 12 settles back to the equilibrium position. The predetermined amplitude is that amplitude at and above which the vibrations of the reed 12 substantially alter the magnetic reluctance across the gap 32 between the poles 34 and 36. The reed 12 vibrates at a frequency which is its natural resonant frequency as determined by the mass and the spring constant of the reed 12 and the damping of the air environment above the liquid within the reservoir 10. When the liquid within the reservoir 10 is at and above the level to be detected 14, movement of the reed 12 is substantially damped by the liquid so that the reed 12 is incapable of vibrating at an amplitude above the predetermined amplitude. Preferably, the reed is incapable of any vibration whatever when the liquid within the reservoir 10 is at and above the level to be detected 14.

Due to the magnetic flux retentivity of the magnetic core 30, a constant residual magnetic flux is maintained within the magnetic core 30 after the surge magnetic flux is dissipated. The residual magnetic flux produces magnetic lines of force extending across the gap 32 between the poles 34 and 36. Thus, the magnetic core 30 acts much the same as if it was a permanent magnet having the poles 34 and 36. The vibrations of the ferromagnetic reed 12 to and from the poles 34 and 36 interrupt the magnetic lines of force extending across the gap 32 between the poles 34 and 36 so as to alter the residual magnetic flux within the magnetic core 30. As the reed 12 moves toward the poles 34 and 36, the residual magnetic flux increases across the gap 32. As the reed 12 moves away from the poles 34 and 36, the residual magnetic flux decreases across the gap 32. Hence, the residual magnetic flux within the magnetic core 30 is modulated by the vibrations of the reed 12 so that the vibrations of the reed 12 produce variations in the residual magnetic flux at an amplitude and frequency corresponding to the amplitude and frequency of the vibrations of the reed 12. The modulated residual magnetic flux passes through the sensing coil 18 via the magnetic core 30 so as to induce an alternating vibration voltage in the sensing coil 18. More properly, the alternating vibration voltage comprises a train of vibration voltage pulses of alternating positive and negative phase at an amplitude and frequency corresponding to the amplitude and frequency of the vibrations of the reed 12.

As previously described, the energization of the driving coil 16 with a voltage pulse generates a surge magnetic flux within the magnetic circuit which passes through the sensing coil 18. The initiation of the energizing voltage pulse produces a rapid increase in the magnetic flux thereby inducing an energization voltage pulse in the sensing coil 18. The termination of the energizing voltage pulse produces a rapid decrease in the magnetic flux thereby inducing another energization voltage pulse in the sensing coil 18. The two energization or test voltage pulses induced in the sensing coil 18 are of opposite positive and negative phase. The exact phase of each of the energization or test voltage pulses is determined by the relative winding relationship between the driving coil 16 and the sensing coil 18. Since the transitions in the surge magnetic flux produced by the energizing voltage pulse are much sharper than the transitions in the residual magnetic flux produced by the vibrations of the reed 12, the energization voltage pulses are of relatively short duration or high natural frequency, while the vibration voltage pulses are of relatively long duration or low natural frequency.

While the inventive vibratory liquid level detector may be applied to monitor the level of virtually any liquid within virtually any reservoir, in the preferred embodiment it is applied to monitor the level of the oil within the engine oil reservoir of an automotive vehicle. However, it should be noted that the inventive vibratory liquid level detector may also be applied to monitor the liquid level within other liquid reservoirs in an automotive vehicle such as the transmission oil reservoir and the cooling system water reservoir.

In the preferred embodiment of the inventive vibratory liquid level detector, a power source is provided by a battery 38 which may be the vehicle battery. The positive side of the battery 38 is connected to a junction 40 through a normally open power switch 42 which may be the vehicle ignition switch. The negative side of the battery 38 is connected directly to ground. A control circuit 39 includes a time delay relay 44 and a series of normally open control switches 46, 48 and 50. The time delay relay 44 is connected from the junction 40 through the control switches 46, 48 and 50 to ground. The time delay relay 44 includes a pair of normally open contacts 52 connected between a junction 54 and ground. The control switch 46 may be a level switch which is closed only when the vehicle is substantially horizontal so that the engine oil reservoir is also relatively horizontal. The control switch 48 may be a speed switch which is closed only when the engine is running at a speed low enough so that the major portion of the oil is within the engine oil reservoir rather than within the engine itself. The control switch 50 may be a thermal switch which is closed only when the oil has reached normal operating temperature so that the viscosity of the oil is constant to insure uniform damping.

In operation, providing the normally open power switch 42 is closed, voltage is applied to the junction 40 by the battery 38. Assuming the normally open control switches 46, 48 and 50 are closed, the time delay relay 44 is energized so that the normally open contacts 52 are closed after the expiration of a short time interval in order to allow the level of the oil to stabilize within the engine oil reservoir when the engine has been previously running at a high speed. With the contacts 52 closed, the junction 54 is connected to ground. Thus, the control circuit 39 renders the liquid level detector inoperative except when the liquid reservoir is horizontal, the liquid level is stable, and the liquid temperature is normal.

The driving circuit 20 comprises a relaxation oscillator circuit 56 and a pulse forming circuit 58. The relaxation oscillator circuit 56 includes a unijunction transistor 60 having emitter, base one, and base two electrodes. The emitter of the unijunction transistor 60 is connected through a resistor 62 to the junction 40 and through the parallel combination of a resistor 64 and a capacitor 66 to the junction 54. The base one of the unijunction transistor 60 is connected through a resistor 68 to ground. The base two of the unijunction transistor 60 is connected through a resistor 70 to the junction 40.

The pulse forming circuit 58 includes a silicon controlled rectifier 72 having anode, cathode, and gate electrodes. The anode of the silicon controlled rectifier 72 is directly connected to the junction 40. The cathode of the silicon controlled rectifier 72 is connected through the series combination of resistors 74 and 76 to ground and through the series combination of a capacitor 78 and the resistor 76 to ground. The gate of the silicon controlled rectifier 72 is connected through a coupling capacitor 80 to the base one of the unijunction transistor 60 and through a resistor 82 to ground. One side of the driving coil 16 is connected through a semiconductor diode 84 to the common junction formed between the resistors 74 and 76 and the capacitor 78, while the other side of the driving coil 16 is connected directly to ground.

The unijunction transistor 60 is initially turned off so that the resistance between the emitter and the base one is relatively high thereby preventing current flow from the emitter to the base one. With voltage supplied to the junction 40 by the battery 38, the capacitor 66 charges through the resistor 62 toward a voltage established by the voltage divider network formed by the resistors 62 and 64. The resistor 68 establishes a bias voltage on the base one and the resistor 70 establishes a bias voltage on the base two. As the capacitor 66 charges, the potential of the emitter eventually increases to the threshold potential of the unijunction transistor 60 so that the unijunction transistor 60 is turned on. As the unijunction transistor 60 turns on, the resistance between the emitter and the base one rapidly decreases so that the voltage on the capacitor 66 is discharged through the unijunction transistor 60 from the emitter to the base one so as to develop an output voltage on the base one which is coupled to the pulse forming circuit 58. When the voltage on the capacitor 66 is completely discharged, the potential of the emitter decreases so that the unijunction transistor 60 is turned off. As the unijunction transistor 60 turns off, the capacitor charges again and the cycle is repeated. The voltage remaining on the base one of the unijunction transistor 60 is dissipated through the resistor 68 to ground. As will be appreciated, the frequency at which the relaxation oscillator circuit 56 develops an output voltage is largely determined by the charging time of the capacitor 66.

The silicon controlled rectifier 72 is initially turned off so that the resistance between the anode and the cathode is relatively high thereby preventing current flow from the anode to the cathode. The output voltage of the relaxation oscillator circuit 56, developed on the base one of the unijunction transistor 60, is coupled by the capacitor 80 to the gate of the silicon controlled rectifier 72 so that the silicon controlled rectifier 72 is turned on. The voltage on the gate of the silicon controlled rectifier 72 is dissipated through the resistor 82 to ground. As the silicon controlled rectifier 72 turns on, the resistance between the anode and the cathode rapidly decreases so that current flows from the anode to the cathode. Initially, the capacitor 78 provides a low impedance shunt across the resistor 74 so that the full battery voltage is applied across the series combination of the capacitor 78 and the resistor 76. However, the low impedance shunt quickly changes to a high impedance shunt as the capacitor 78 becomes fully charged so that the full battery voltage is applied across the series combination of resistors 74 and 76. Together, the resistors 74 and 76 limit the current flow through the silicon controlled rectifier 72 to a value below the holding current of the silicon controlled rectifier 72 so that the silicon controlled rectifier 72 is turned off. As the silicon controlled rectifier 72 turns off, the capacitor 78 discharges through the resistors 74 and 76 to ground.

Hence, the voltage appearing across the resistor 76 takes the form of a pulse which rises rapidly to the full battery voltage as the silicon controlled rectifier 72 turns on, and then decreases rapidly to a voltage established by the voltage divider network formed by the resistors 74 and 76 as the capacitor 78 becomes fully charged, and then decreases rapidly to ground as the silicon controlled rectifier 72 turns off. The voltage pulse appearing across the resistor 76 is applied through the semiconductor diode 84 so as to energize the driving coil 16. The semiconductor diode 84 isolates the driving coil 16 from the driving circuit 20.

Thus, the driving circuit 20 energizes the driving coil 16 with a voltage pulse each time the pulse forming circuit 58 is triggered by an output voltage from the relaxation oscillator circuit 56. The frequency of the relaxation oscillator circuit 56 is selected so that voltage pulses are intermittently applied to the driving coil 16 so as to produce individual deflections of the reed 12. The reed 12 is allowed to move freely in the interval between the individual deflections so as to initiate predetermined vibrations of the reed 12, as previously described, when the liquid in the reservoir 10 is below the level to be detected 14.

The sensing circuit 22 includes an amplifier circuit 86, a discriminator circuit 87, and an indicator circuit 88. The amplifier circuit 86 comprises a first stage and a second stage. The first stage of the amplifier circuit 86 includes a transistor 90 having emitter, base, and collector electrodes. The emitter of the transistor 90 is connected through the parallel combination of a resistor 92 and a capacitor 94 to ground. The base of the transistor 90 is connected through a resistor 96 to the junction 40 and through a resistor 98 to ground. One side of the sensing coil 22 is connected through a coupling capacitor 100 to the base of the transistor 90, while the other side of the sensing coil 22 is directly connected to ground. The collector of the transistor 90 is connected through the primary winding of a coupling transformer 102 to the junction 40 and through a capacitor 104 to ground. The second stage of the amplifier circuit 86 includes a transistor 106 having emitter, base, and collector electrodes. The emitter of the transistor 106 is directly connected to ground. The base 106 is directly connected to ground. The base of the transistor 106 is connected through a resistor 108 to the junction 40, through a resistor 110 to ground, and through a coupling capacitor 112 and the secondary winding of the coupling transformer 102 to ground. The collector of the transistor 106 is coupled to the discriminator circuit 87. Although the transistors 90 and 106 are illustrated as being of the NPN type, they may also be of the PNP type.

The discriminator circuit 87 comprises a filter network 114 and a selector switch 116. The indicator circuit 88 comprises the selector switch 116, a control relay 118, a holding branch 120, and a signal branch 122. The control relay 118 is connected from the junction 40 through a resistor 124 to the collector of the transistor 106. The control relay 118 includes a pair of normally open contacts 126 in the holding branch 120 and a pair of normally open contacts 128 in the signal branch 122. The filter network 114 comprises the resistor 124 and a capacitor 130 connected between the junction 40 and the collector of the transistor 106. The holding branch 120 includes the series combination of the normally open contacts 126 and a resistor 132 connected between the selector switch 116 and ground. The signal branch 122 includes the series combination of the normally open contacts 128 and a signal lamp 134 connected between the junction 40 and ground. The selector switch 116 comprises a single throw double pole switch having an arm 136 and two terminals 138 and 140. The arm 136 is directly connected to the control relay 118. The terminal 138 is directly connected to the holding branch 120. The terminal 140 is directly connected to the collector of the transistor 106. When the arm 136 is in contact with the terminal 138, the selector switch 116 is in the normal position and the sensing circuit 22 and the discriminator circuit 87 are in the normal state. When the arm 136 is in contact with the terminal 140, the selector switch is in the test position and the sensing circuit 22 and the discriminator circuit 87 are in the test state.

Assuming that a voltage is applied to the junction 40 by the battery 38, the resistors 96 and 98 provide a voltage divider network which establishes a bias voltage on the base of the transistor 90 and the resistor 92 establishes a bias voltage on the emitter of the transistor 90 so that the transistor 90 is turned on in essentially Class A amplifier operation. In Class A amplifier operation, a relatively large direct current flows between the junction 40 and ground through the primary winding of the coupling transformer 102, through the transistor 90, and through the resistor 92. The resistors 108 and 110 provide a voltage divider network which establishes a bias voltage on the base of the transistor 106 so that the transistor 106 is turned on in essentially Class B amplifier operation. In Class B amplifier operation, a relatively small direct current flows between the junction 40 and ground through the control relay 118, through the resistor 124, and through the transistor 106. However, the magnitude of the direct current is insufficient to energize the control relay 118.

The energization or test voltage pulses and the vibration voltage pulses are coupled from the sensing coil 22 to the base of the transistor 90 through the capacitor 100 so that the voltage pulses are amplified by the transistor 90. The current produced by the amplified voltage pulses flows between the junction 40 and ground through the primary winding of the coupling transformer 102, through the transistor 90, and through the capacitor 94. The capacitor 94 shunts the amplified voltage pulses across the resistor 92 so as to avoid upsetting the bias voltage on the emitter of the transistor 90. The amplified voltage pulses are inductively coupled from the primary winding to the secondary winding of the coupling transformer 102 which matches the output impedance of the first stage of the amplifier circuit 86 with the input impedance of the second stage of the amplifier circuit 86. The coupling transformer 102 has a stepup ratio so as to further amplify the voltage pulses transferred between the primary winding and the secondary winding. The capacitor 104 tunes the coupling transformer 102 to approximately the natural resonant frequency of the reed 12 when the liquid within the reservoir 10 is below the level to be detected 14 thereby maximizing the amplification of the voltage pulses transferred across the coupling transformer 102. From the secondary winding of the coupling transformer 102, the amplified voltage pulses are coupled to the base of the transistor 106 through the capacitor 112.

As will be remembered, the energization or test voltage pulses and the vibration voltage pulses are of alternating positive and negative phase, and the energization or test voltage pulses are of relatively short duration or high natural frequency, while the vibration voltage pulses are of relatively long duration or low natural frequency. Due to the phase shifting capability of the transistor 90 and the coupling transformer 102 the phase of the amplified voltage pulses at the base of the transistor 106 may be made either identical or opposite to the phase of the voltage pulses at the base of the transistor 90. However, since the transistor 106 is operating in Class B amplifier operation, only the positive phase voltage pulses are amplified by the transistor 106. These amplified voltage pulses are applied by the transistor 106 to the discriminator circuit 87. It will be readily apparent that if the energization and vibration voltage pulses induced in the sensing coil 18 are of sufficient magnitude, the amplifier circuit 86 may be eliminated, in which case the sensing circuit 22 comprises the discriminator circuit 87 and the indicator circuit 88.

During normal operation of the inventive vibratory liquid level detector, the selector switch 116 is placed in the normal position 138 so as to connect the holding branch 120 to the control relay 118 and so that the output of the filter network 114 is applied to the control relay 118. When a relatively short duration energization or test voltage pulse reaches the filter network 114, the voltage pulse appears across the capacitor 130 and across the resistor 124 and the control relay 118. Due to the relatively short duration of the voltage pulse and the presence of the resistor 124, the current developed by the voltage pulse through the control relay 118 is insufficient to energize the control relay 118. Thus, the relatively short duration voltage pulse is attenuated by the filter network 114 and is not applied to energize the control relay 118.

When a train of relatively long duration vibration voltage pulses reaches the filter network 114, the voltage pulses again appear across the capacitor 130 and across the resistor 124 and the control relay 118. Due to the relatively long duration of the voltage pulses, the current developed by the voltage pulses through the resistor 124 and the control relay 118 is sufficient to energize the control relay 118. Thus, the relatively long duration vibration pulses are passed by the filter network 114 and are applied to energize the control relay 118 thereby closing the normally open contacts 126 and 128. With the contacts 128 closed in the signal branch 122, the signal lamp 134 is activated so as to emit a sensory response in the form of a visual signal. With the contacts 126 closed in the holding branch 120 and with the holding branch 120 connected to the control relay 118 through the selector switch 116, the control relay 118 remains energized through the holding branch 120 for a relatively long or indeterminate period until the power switch 42 is opened. Since the control relay 118 remains energized for a relatively long or indeterminate period, the signal lamp 134 likewise remains activated for a relatively long or indeterminate period thereby indicating that the liquid within the reservoir 10 is below the level to be detected 14.

During test operation of the inventive vibratory liquid level detector, the selector switch 116 is placed in the test position 140 so as to disable the holding branch 120 by disconnecting it from the control relay 118 and so as to place a short circuit shunt across the resistor 124 thereby bypassing the filter network 114. When a relatively short duration energization or test voltage pulse reaches the filter network 114, the voltage pulse appears across the capacitor 130 and across the control relay 118. Due to the absence of the resistor 124, the current developed by the relatively short duration voltage pulse through the control relay 118 is sufficient to energize the control relay 118 so as to close the normally open contacts 126 and 128. With the contacts 128 closed in the signal branch 122, the signal lamp 134 is activated so as to emit a sensory response in the form of a visual signal. With the holding branch 120 disconnected from the control relay 118 by the selector switch 116, the control relay 118 remains energized for a relatively short determinate period until the current developed by the energization voltage pulse diminishes below the holding current of the control relay 118. Since the control relay 118 remains energized for a relatively short determinate period, the signal lamp 134 likewise remains activated for a relatively short determinate period thereby indicating that the driving coil 16, the sensing coil 18, the driving circuit 20, and the sensing circuit 22 are functioning properly.

When a train of relatively long duration vibration voltage pulses reaches the filter network 114, the voltage pulses again appear across the capacitor 130 and across the control relay 118. Due to the absence of the resistor 124, the current developed by the relatively long duration voltage pulses through the control relay 118 is sufficient to energize the control relay 118 so as to close the normally open contacts 126 and 128. Again, with the contacts 128 closed in the signal branch 122, the signal lamp 134 is activated so as to emit a sensory response in the form of a visual signal. With the holding branch 120 disconnected from the control relay 118 by the selector switch 116, the control relay 118 remains energized for a relatively long determinate period until the current developed by the train of vibration voltage pulses diminishes below the holding current of the control relay 118. Since the control relay 118 remains energized for a relatively long determinate period, the signal lamp 134 likewise remains activated for a relatively long determinate period thereby indicating that the liquid within the reservoir 10 is below the level to be detected 14.

In a vibratory liquid level detector, constructed in accordance with the present invention, the following circuit components were employed:

| Control devices: | Types |
| --- | --- |
| Unijunction transistor 60 | 2N494 |
| Silicon controlled rectifier 72 | 2N1771A |
| Diode 84 | 1N1581 |
| Transistor 90 | 2N338 |
| Transistor 106 | 2N2219 |
| Control relay 118 | TS1542C |

| Capacitors: | Microfarads |
| --- | --- |
| Capacitor 66 | 25.0 |
| Capacitor 80 | 0.68 |
| Capacitor 78 | 2000.0 |
| Capacitor 94 | 220.0 |
| Capacitor 100 | 10.0 |
| Capacitor 104 | 0.33 |
| Capacitor 112 | 10.0 |
| Capacitor 130 | 100.0 |

| Resistors: | 1,000 ohms |
| --- | --- |
| Resistor 62 | 100.0 |
| Resistor 64 | 560.0 |
| Resistor 68 | 0.039 |
| Resistor 70 | 0.270 |
| Resistor 74 | 1.0 |
| Resistor 76 | 3.3 |
| Resistor 82 | 22.0 |
| Resistor 92 | 0.470 |
| Resistor 96 | 47.0 |
| Resistor 98 | 27.0 |
| Resistor 108 | 15.0 |
| Resistor 110 | 0.820 |
| Resistor 124 | 0.180 |
| Resistor 132 | 1.5 |

In a vibratory liquid level detector of the single signal type, the reed is intermittently driven by the driving coil so as to initiate free vibrations of the reed only when the reed is out of the liquid. Therefore, an output signal is produced only when the liquid is below the level to be detected. Conversely, in a vibratory liquid level detector of the double signal type, the reed is continuously driven by the driving coil so as to produce vibrations of the reed both when the reed is in the liquid and when the reed is out of the liquid. Therefore, an output signal of one amplitude is produced when the liquid is below the level to be detected and an output signal of another amplitude is produced when the liquid is at and above the level to be detected. Thus, a vibratory liquid level detector of the single signal type possesses the important advantage of being primarily independent of variations in the amplitude of the output signal. However, a vibratory liquid level detector of the double signal type possesses the equally important advantage of continuously producing an output signal regardless of the level of the liquid being monitored so that it is always possible to ascertain whether the liquid level detector is functioning properly in the working environment by observing the presence or absence of an output signal. As will be readily appreciated, the inventive vibratory liquid level detector provides both the advantage of relative insensitivity to variations in the amplitude of the output signal and the advantage of automatic testing in the working environment in order to determine whether the liquid level detector is functioning properly.

It is to be understood that the preferred embodiment of the invention described herein is shown for illustrative purposes only and that various modifications may be made without departing from the spirit of the invention which is to be limited only by the following claims.

We claim:

1. A liquid level detector, comprising: movable means positionable relative to a liquid reservoir so that movement of the movable means is substantially undamped by the liquid when the liquid is below a level to be detected; an electromagnetic driving winding and an electromagnetic sensing winding magnetically coupled with the movable means and with each other; and driving means for energizing the driving winding so as to magnetically generate a corresponding signal having a relatively high natural frequency in the sensing winding thereby indicating that the driving winding and the sensing winding are functioning properly, and so as to magnetically produce predetermined movements of the movable means when movement of the movable means is substantially undamped by the liquid so that the predetermined movements of the movable means magnetically generate a corresponding signal having a relatively low natural frequency in the sensing winding thereby indicating that the liquid is below the level to be detected.

2. A liquid level detector, comprising: movable means positionable relative to a liquid reservoir so that movement of the movable means is substantially undamped by the liquid when the liquid is below a level to be detected; an electromagnetic driving winding and an electromagnetic sensing winding magnetically coupled with the movable means and with each other; driving means for energizing the driving winding so as to magnetically generate a corresponding energization signal having a relatively high natural frequency in the sensing winding and so as to magnetically produce predetermined vibrations of the movable means when movement of the movable means is substantially undamped by the liquid so that the predetermined vibrations of the movable means magnetically generate a corresponding vibration signal having a relatively low natural frequency in the sensing winding; and sensing means responsive to the relatively low natural frequency of the vibration signal so as to indicate that the liquid is below the level to be detected and responsive to the relatively high natural frequency of the energization signal so as to indicate that the driving winding, the sensing winding, the driving means, and the sensing means are functioning properly.

3. A liquid level detector for monitoring the level of a liquid within a reservoir, comprising: movable means positionable relative to the reservoir so that movement of the movable means is substantially damped by liquid when the liquid is at and above a level to be detected and so that movement of the movable means is substantially undamped by the liquid when the liquid is below the level to be detected; an electromagnetic driving coil and an electromagnetic sensing coil; magnetic means for magnetically linking the driving coil, the sensing coil, and the movable means; driving means for energizing the driving coil with a voltage pulse so as to magnetically induce an energization voltage pulse having a relatively high natural frequency in the sensing coil and so as to magnetically produce predetermined vibrations of the movable means when movement of the movable means is substantially undamped by the liquid so that the predetermined vibrations of the movable means magnetically induce a train of vibration voltage pulses having a relatively low natural frequency in the sensing coil; and sensing means having a normal state responsive to the relatively low natural frequency of the train of vibration voltage pulses so as to indicate that the liquid is below the level to be detected and having a test state responsive to the relatively high natural frequency of the energization voltage pulse so as to indicate that the driving coil, the sensing coil, the driving means, and the sensing means are functioning properly.

4. A liquid level detector for monitoring the level of a liquid within a reservoir, comprising: a movable magnetic reed positionable within the reservoir so that movement of the reed is substantially damped by the liquid when the liquid is at and above a level to be detected and so that movement of the reed is substantially undamped by the liquid when the liquid is below the level to be detected; an electromagnetic driving coil and an electromagnetic sensing coil; magnetic means for magnetically linking the driving coil, the sensing coil, and the reed; driving means for energizing the driving coil with a voltage pulse so as to magnetically induce a short duration voltage pulse in the sensing coil and so as to magnetically produce predetermined vibrations of the reed when movement of the reed is substantially undamped by the liquid so that the predetermined vibrations of the reed magnetically induce relatively long duration voltage pulses in the sensing coil; discriminator means operable in a normal state so as to pass the long duration voltage pulses and operable in a test state so as to pass the short duration voltage pulse; and indicator means responsive to the long duration voltage pulses passed by the discriminator means so as to indicate that the liquid is below the level to be detected and responsive to the short duration voltage pulse passed by the discriminator means and so as to indicate that the liquid level detector is functioning properly.

5. A liquid level detector for monitoring the level of a liquid within a reservoir, comprising: a movable magnetic reed positionable within the reservoir so that movement of the reed is substantially damped by the liquid when the liquid is at and above a level to be detected and so that movement of the reed is substantially undamped by the liquid when the liquid is below the level to be detected; a magnetic core having a gap which magnetically embraces the reed; an electromagnetic driving coil wound upon the core so that energization of the driving coil with a voltage generates a surge magnetic flux within the core so as to deflect the reed and so as to develop a residual magnetic flux within the core; driving means for intermittently energizing the driving coil with a voltage pulse so as to produce predetermined vibrations of the reed when movement of the reed is substantially undamped by the liquid so that the residual magnetic flux within the core is correspondingly modulated by the predetermined vibrations of the reed within the gap; an electromagnetic sensing coil wound upon the core so that the surge magnetic flux induces relatively short duration voltage pulses in the sensing coil and so that the modulated residual magnetic flux induces relatively long duration voltage pulses in the sensing coil; filter means for passing the long duration voltage pulses and for attenuating the short duration voltage pulses; switching means for selectively passing the short duration voltage pulses; and indicator means responsive to the long duration voltage pulses passed by the filter means so as to indicate that the liquid is below the level to be detected and responsive to the short duration voltage pulses passed by the switching means so as to indicate that the liquid level detector is functioning properly.

6. A liquid level detector for monitoring the level of a liquid within a reservoir, comprising: a flexible magnetic reed positionable within the reservoir so that movement of the reed is substantially damped by the liquid when the liquid is at and above a level to be detected and so that movement of the reed is substantially undamped by the liquid when the liquid is below the level to be detected; a magnetic core having a gap across which the reed is located; an electromagnetic driving coil wound upon the core so that energization of the driving coil with a voltage pulse generates a surge magnetic flux within the core so as to develop a magnetic field within the gap thereby deflecting the reed and so as to develop a residual magnetic flux within the core thereby providing magnetic lines of force across the gap; driving means for intermittently energizing the driving coil with a voltage pulse thereby producing individual deflections of the reed which is allowed to move freely in the interval between the deflections so as to initiate predetermined vibrations of the reed when movement of the reed is substantially undamped by the liquid so that the magnetic lines of force across the gap are altered by the predetermined vibrations of the reed so as to produce corresponding variations in the residual magnetic flux within the core; an electromagnetic sensing coil wound upon the core so that the surge magnetic flux induces relatively short duration voltage pulses in the sensing coil and so that the varying residual magnetic flux induces relatively long duration voltage pulses in the sensing coil; filter means for passing the long duration voltage pulses and for attenuating the short duration voltage pulses; switching means for selectively passing the short duration voltage pulses; and indicator means including signal means activated so as to emit a signal for a relatively long period in response to the long duration voltage pulses passed by the filter means thereby indicating that the liquid is below the level to be detected and activated so as to emit a signal for a relatively short period in response to the short duration voltage pulses passed by the switching means thereby indicating that the liquid level detector is functioning properly.

7. A liquid level detector for monitoring the level of a liquid within a reservoir in an automotive vehicle having a battery and an ignition switch, comprising: a flexible magnetic reed positionable within the reservoir so that movement of the reed is substantially damped by the liquid when the liquid is at and above a level to be detected and so that movement of the reed is substantially undamped by the liquid when the liquid is below the level to be detected; a magnetic core having a gap across which the reed is located; an electromagnetic driving coil wound upon the core so that energization of the driving coil with a voltage pulse generates a surge magnetic flux within the core so as to develop a magnetic field within the gap thereby deflecting the reed and so as to develop a residual magnetic flux within the core thereby providing magnetic lines of force across the gap; driving means connected to the battery through the ignition switch for intermittently energizing the driving coil with a voltage pulse thereby producing individual deflections of the flexible reed which is allowed to move freely in the interval between the deflections so as to initiate predetermined vibrations of the reed when movement of the reed is substantially undamped by the liquid so that the magnetic lines of force across the gap are altered by the predetermined vibrations of the reed so as to produce corresponding variations in the residual magnetic flux within the core; an electromagnetic sensing coil wound upon the core so that the surge magnetic flux induces relatively short duration voltage pulses in the sensing coil and so that the varying residual magnetic flux induces relatively long duration voltage pulses in the sensing coil; signal means for providing a sensory signal when activated; relay means for activating the signal means when energized; holding means for continuously energizing the relay means once the relay means is initially energized; filter means for attenuating the short duration voltage pulses and for passing the long duration voltage pulses so as to apply the long duration voltage pulses to energize the relay means which remains energized by the holding means so that the signal means is activated for an indeterminate period thereby indicating that the liquid is below the level to be detected; and switching means for effectively disabling the holding means and for effectively bypassing the filter means so as to apply the short duration voltage pulses to energize the relay means so that the signal means is activated for a determinate period thereby indicating that the liquid level detector is functioning properly; and control means for rendering the liquid level detector inoperative except when the reservoir is horizontal, the level of the liquid is stable, and the temperature of the liquid is steady.